United States Patent
Siddhamalli et al.

(10) Patent No.: US 8,956,706 B2
(45) Date of Patent: Feb. 17, 2015

(54) FLEXIBLE TUBING MATERIAL AND METHOD OF FORMING THE MATERIAL

(75) Inventors: Sridhar Krishnamurthi Siddhamalli, Lutz, FL (US); Zhizhong Liu, Shrewsbury, MA (US); Mark W. Simon, Pascoag, RI (US); Charles S. Golub, Westford, MA (US); Heidi Sardinha, Shrewsbury, MA (US); Wayne Edward Garver, Hudson, OH (US); Mark F. Colton, Rootstown, OH (US); Robert L. Wells, Aiken, SC (US); Gerald L. Stadt, St Petersburg, FL (US); Michael J. Tzivanis, Chicopee, MA (US); William Risen, Venice, FL (US); Nathan Klettlinger, Medina, OH (US)

(73) Assignee: Saint-Gobain Performance Plastics Corporation, Aurora, OH (US)

(*) Notice: Subject to any disclaimer, the term of this patent is extended or adjusted under 35 U.S.C. 154(b) by 109 days.

(21) Appl. No.: 12/981,348

(22) Filed: Dec. 29, 2010

(65) Prior Publication Data

US 2011/0241262 A1   Oct. 6, 2011

Related U.S. Application Data

(60) Provisional application No. 61/290,731, filed on Dec. 29, 2009.

(51) Int. Cl.
| | |
|---|---|
| C08L 23/12 | (2006.01) |
| C08L 33/00 | (2006.01) |
| C08L 33/02 | (2006.01) |
| C08L 33/08 | (2006.01) |
| C08L 33/10 | (2006.01) |
| C08L 53/02 | (2006.01) |
| B29C 35/08 | (2006.01) |
| B29D 24/00 | (2006.01) |
| C08L 47/00 | (2006.01) |
| C08J 3/24 | (2006.01) |
| C08L 9/06 | (2006.01) |
| C08L 23/16 | (2006.01) |
| F16L 11/04 | (2006.01) |
| B29C 45/00 | (2006.01) |
| B29C 71/04 | (2006.01) |
| B29L 23/00 | (2006.01) |

(52) U.S. Cl.
CPC ............. *C08L 47/00* (2013.01); *C08J 3/246* (2013.01); *C08L 9/06* (2013.01); *C08L 23/16* (2013.01); *C08L 53/02* (2013.01); *F16L 11/04* (2013.01); *B29C 45/0001* (2013.01); *B29C 71/04* (2013.01); *B29C 2035/085* (2013.01); *B29C 2035/0877* (2013.01); *B29L 2023/005* (2013.01); *C08L 2312/00* (2013.01)
USPC ........ 428/35.7; 428/36.8; 428/36.9; 522/109; 522/112; 525/98; 525/99

(58) Field of Classification Search
USPC ........ 522/109, 11, 112; 525/98, 99; 428/35.7, 428/36.8, 36.9
See application file for complete search history.

(56) References Cited

U.S. PATENT DOCUMENTS

| | | |
|---|---|---|
| 4,031,169 A | 6/1977 | Morris |
| 4,101,699 A | 7/1978 | Stine et al. |
| 4,104,210 A | 8/1978 | Coran et al. |
| 4,678,834 A | 7/1987 | Boivin et al. |
| 4,705,657 A | 11/1987 | Poulin |
| 4,842,024 A | 6/1989 | Palinchak |
| 5,007,943 A | 4/1991 | Kelly et al. |
| 5,080,942 A | 1/1992 | Yau |
| 5,159,016 A | 10/1992 | Inoue et al. |
| 5,264,488 A | 11/1993 | Takeuchi et al. |
| 5,407,971 A | 4/1995 | Everaerts et al. |
| 5,539,052 A | 7/1996 | Shieh et al. |
| 5,550,190 A | 8/1996 | Hasegawa et al. |
| 5,843,577 A | 12/1998 | Ouhadi et al. |
| 5,869,555 A | 2/1999 | Simmons et al. |
| 5,883,145 A | 3/1999 | Hurley et al. |

(Continued)

FOREIGN PATENT DOCUMENTS

| | | |
|---|---|---|
| CA | 2127575 | 1/1995 |
| CN | 1730518 A | 2/2003 |
| CN | 1486243 A | 3/2004 |
| EP | 1688458 A1 | 8/2006 |
| FR | 2730242 A1 | 8/1996 |

(Continued)

OTHER PUBLICATIONS

"Electron Beam processing of Polymers", Sujit K. Datta, Tapan K. Chaki and Anil K. Bhowmick, Advanced Polymer Processing Operations, pp. 157-186 (1998).

(Continued)

*Primary Examiner* — Jeffrey Mullis
(74) *Attorney, Agent, or Firm* — Abel Law Group, LLP; Chi Suk Kim

(57) ABSTRACT

A flexible tubing material includes a radiation crosslinked blend of a first elastomeric polymer including a styrenic thermoplastic elastomer, an ethylene vinyl acetate elastomer, a polyolefin elastomer with a second elastomeric polymer including a polyolefin elastomer, a diene elastomer, or combination thereof, with the proviso that the first elastomeric polymer and the second elastomeric polymer are different. In an embodiment, a method of making a material includes providing the first elastomeric polymer, providing the second elastomeric polymer, blending the first elastomeric polymer and the second elastomeric polymer, extruding or injection molding the blend, and crosslinking the blend with radiation.

12 Claims, 10 Drawing Sheets

(56) References Cited

U.S. PATENT DOCUMENTS

| | | | |
|---|---|---|---|
| 5,952,396 | A | 9/1999 | Chang |
| 5,985,962 | A | 11/1999 | Knors et al. |
| 6,053,214 | A | 4/2000 | Sjoberg et al. |
| 6,063,867 | A | 5/2000 | Wang et al. |
| 6,339,123 | B1 | 1/2002 | Raetzsch et al. |
| 6,569,915 | B1 | 5/2003 | Jackson et al. |
| 6,656,552 | B1 | 12/2003 | Crouse |
| 6,743,860 | B2 | 6/2004 | Mizuno |
| 6,846,535 | B2 | 1/2005 | De Groot et al. |
| 6,977,105 | B1 | 12/2005 | Fujieda et al. |
| 7,253,233 | B2 | 8/2007 | Sugimoto et al. |
| 7,262,248 | B2 | 8/2007 | Wright et al. |
| 7,393,900 | B2 | 7/2008 | Snider |
| 7,714,071 | B2 | 5/2010 | Hoenig et al. |
| 7,754,816 | B2 | 7/2010 | Snider |
| 7,923,121 | B2 | 4/2011 | Jackson et al. |
| 2002/0068137 | A1 | 6/2002 | Paleari et al. |
| 2003/0052431 | A1 | 3/2003 | Shah et al. |
| 2003/0199623 | A1 | 10/2003 | Demay et al. |
| 2004/0132907 | A1 | 7/2004 | Nakamura et al. |
| 2004/0219317 | A1 | 11/2004 | Belcher |
| 2005/0239940 | A1* | 10/2005 | Shima et al. ............... 524/439 |
| 2006/0063850 | A1* | 3/2006 | Kanae et al. ................. 522/1 |
| 2006/0211819 | A1 | 9/2006 | Hoenig et al. |
| 2007/0066753 | A1 | 3/2007 | Ehrlich et al. |
| 2007/0225429 | A1 | 9/2007 | Wright et al. |
| 2007/0282073 | A1 | 12/2007 | Weng et al. |
| 2007/0284787 | A1 | 12/2007 | Weng et al. |
| 2008/0045619 | A1* | 2/2008 | Jackson et al. ............ 522/32 |
| 2008/0242758 | A1 | 10/2008 | Jackson et al. |
| 2009/0292075 | A1* | 11/2009 | Tamai et al. ............... 525/221 |

FOREIGN PATENT DOCUMENTS

| | | |
|---|---|---|
| FR | 2799199 A1 | 4/2001 |
| GB | 2007682 A | 5/1979 |
| JP | 58098347 A | 6/1983 |
| JP | 58145751 A | 8/1983 |
| JP | 58225103 | 12/1983 |
| JP | 59131613 A | 7/1984 |
| JP | 60166339 A | 8/1985 |
| JP | 63172753 A | 7/1988 |
| JP | 4025520 | 1/1992 |
| JP | 4139219 A | 5/1992 |
| JP | H04159344 A | 6/1992 |
| JP | H0593125 A | 4/1993 |
| JP | 8294967 A | 11/1996 |
| JP | 10067893 A | 3/1998 |
| JP | 10087902 A | 4/1998 |
| JP | 10273511 A | 10/1998 |
| JP | 11060835 | 3/1999 |
| JP | 2001240719 A | 9/2001 |
| JP | 2002173574 A | 6/2002 |
| JP | 2005093125 A | 4/2005 |
| JP | 2005225977 A | 8/2005 |
| JP | 2005314550 A | 11/2005 |
| JP | 2007254514 | 10/2007 |
| WO | 0069930 A1 | 11/2000 |
| WO | 0112717 A1 | 2/2001 |
| WO | 0232983 A1 | 4/2002 |
| WO | 2005054360 A2 | 6/2005 |
| WO | 2008014597 A1 | 2/2008 |
| WO | 2011090759 A2 | 7/2011 |

OTHER PUBLICATIONS

"Mechanical Properties and heat shrinkability of e-beam crosslinked polyethylene-octene copolymer", Joy K. Mishra, Young-Wook Chang, Byung Chul Lee and Sung Hun Ryu, Radiation Physics and Chemistry, vol. 77 (2008), pp. 675-679.

"Measurement of crosslinking degree for E-beam irradiated block copolymers", Hisashige Kanbara, Samuel J. Huang and Julian F. Johnson, Polymer Engineering and Science, vol. 34 (1994), pp. 691-694.

"Characterization of e-beam crosslinked Poly (styrene-block-ethylene-co-butylene-block-styrene)" D.E. Zurawski and L.H. Sperling, Polymer Engineering and Science, vol. 23 (1983), pp. 510-515.

"Effects of gamma irradiation on ethylene-octene copolymers produced by constrained geometry catalyst", Roberto S. Benson, Erin A. Moore, Ma. Esther Martinez-Pardo and Daniel Luna Zaragoza, Nuclear Instruments and Methods in Physics Research B, vol. 151 (1999), pp. 174-180.

"Co-continuous morphologies in polymer blends with SEBS block copolymers", Harm Veenstra, Barbara J.J. van Lent, Jaap van Dam, and Abe Posthuma de Boer, Polymer vol. 40 (1999), pp. 6661-6672.

"Compatibilisation of polystyrene-polyolefin blends", Tracey Appleby, Ferenc Cser, Graeme Moad, Ezio Rizzardo, and Con Starvropoulos, Polymer Bulletin, vol. 32 (1994), pp. 479-485.

"Effects of molecular weight of SEBS triblock copolymer on the morphology, impact strength, and rheological property of syndiotactic polystyrene/ethylene-propylene rubber blends", B.K. Hong and W.H Jo, Polymer, vol. 41 (2000), pp. 2069-2079.

"Functionalization of Polyolefins and Elastomers with an Oxazoline Compound", U. Anttila, C. Vocke, and J. Seppala, Journal of Applied Polymer Science, vol. 72, (1999), pp. 877-885.

"High Performance Styrenic Thermoplastic Vulcanizates With Good Elastic Recovery and Heat Stability at Elevated Temperature", Jushik Yun, Raman Patel, and Darnell C. Worley II, Society of Plastics Engineers, 7th Thermoplastic Elastomers Topical Conference 2005—Expanding Materials Applications and Markets (2005), 8 pgs.

"High-Performance Styrenic Thermoplastic Vulcanizates for Long-Term Application", Jushik Yun, Raman Patel, and Darnell C. Worley II, Journal of Applied Polymer Science, vol. 105, (2007), pp. 996-3005.

"High Performance Thermoplastic Vulcanizate made by a Novel Hydrogenated Styrenic Block Copolymer/Polypropylene Blends", Eiji Nakamura, Kenji Shachi, ACS Rubber Division, (2005), paper 80, 10 pgs.

"Styrene-Butadiene Random Copolymer as Performance Enhancing Additive in Thermoplastic Elastomers", Ajbani M, Kiehl C, and Takacs A., ACS Rubber Division, (2003), paper 5, 8 pgs.

"High Temperature Performance of SEBS based Compounds", E. Colchen, and Hde Groot, TPE 2008, TPE in der Prozesskette, VDI-Gesellschaft Kunststofftechnik, vol. 4292, (2008), pp. 149-161.

"Innovative Solutions for Achieving High Temperature Performance with Styrenic TPEs", Kathryn J. Wright, and Henk de Groot, ACS Rubber Division, Paper 2, (2008), 25 pgs.

"Mechanical property modification and morphology of poly (styrene-b-hydrogenated butadiene-b-styrene) poly (hydrogenated butadiene) blends", J.P. Baetzold, I. Gancarz, X. Quan, and J.T. Koberstein, Macromolecules, (1994), pp. 5329-5340.

"New TPEs Partially Crosslinked Using Functionalised Random Copolymers", Daniel Milesi, (CT)New opportunities for thermoplastic elastomers, (2000), pp. 11.1-11.3.

"Performance Enhancing Crosslinked SBR Masterbatches for Thermoplastic Elastomers", Manoj Ajbani and Chris Kiehl, Annual Technical Conference—ANTEC, Conference Proceedings, (2004), vol. 3, pp. 4182-4186.

"Polypropylene/talc/SEBS (SEBS-g-MA) composites. Polypropylene/talc/SEBS (SEBS-g-MA) composites. Part 2. Mechanical properties", Matjaz Denac, Vojko Musil, Ivan Smit, Composites Part A (Applied Science and Manufacturing), (2005), vol. 36, pp. 1282-1290.

"Recent development in styrenic block copolymer technology", Bing Yang, Society of Plastics Engineers, 7th Thermoplastic Elastomers Topical Conference 2005—Expanding Materials Applications and Markets, (2005), 4 pgs.

"Septon V—A HSBC (hydrogenated styrenic block co-polymer) with reactive hard blocks", Katsunori Takamoto and Ralph Bohm, Rubber Fiber and Plastics, (2005), pp. 249-254. (with partial translation).

(56) References Cited

OTHER PUBLICATIONS

Study of the Characteristics of Thermoplastic Vulcanizates of PP/SEPS/SBS Blends, Michihisa Tasaka and Shinzo Saito, Riken Vinyl Industry Co., (2000), 5 pgs.

"Time dependent deformation behavior of thermoplastic elastomers", H.H. Lee, Th. Lupke, T. Pham, H-J Radusch, Polymer 44, No. 16, (2003), pp. 4589-4597.

"TPEs are creating value throughout the world", R. Eller, Modern Plastics World Encyclopedia, (2006), pp. 107-108.

"Radiation Effects on SBR-EPDM Blends: A Correlation with Blend Morphology", K. A. Dubey et al., Journal of Polymer Science: Part B: Polymer Physics, 2006, vol. 44, pp. 1676-1689.

International Search Report, PCT/US2010/062430, Sep. 16, 2011 (4 pages).

* cited by examiner

| Sample Code | SBC Resin | SBC Resin, % | Shore Hardness, A | Young's Modulus, Mpa | 100%-Modulus, Mpa | Tensile Strength, Mpa | Elongation, % | Clarity |
|---|---|---|---|---|---|---|---|---|
| Kraton G1643 | | 100 | 56 | 4.00 | 1.53 | 6.3 | 650 | Clear |
| 5729-41-1 | Kraton G1643 | 80 | 57 | 4.21 | 1.55 | 8.4 | 1087 | Transluscent |
| 5729-41-2 | Kraton G1643 | 60 | 60 | 4.63 | 1.53 | 11.8 | 1002 | Transluscent |
| 5729-41-3 | Kraton G1643 | 50 | 61 | 4.98 | 1.55 | 12.4 | 1027 | Transluscent |
| 5729-41-4 | Kraton G1643 | 40 | 62 | 5.28 | 1.61 | 14.7 | 1200 | Transluscent |
| 5729-41-5 | Kraton G1643 | 20 | 64 | 5.41 | 1.63 | 13.8 | 1235 | Transluscent |
| EPDM Nordel IP4725 | | 0 | 66 | 5.52 | 1.65 | 14.4 | 1211 | Clear |
| KRTON MD6945 | | 100 | 45 | 1.40 | 0.80 | 12.8 | 1300 | Clear |
| 5729-41-6 | Kraton D6945 | 80 | 40 | 1.67 | 0.87 | 13.02 | 1271 | Clear |
| 5729-41-7 | Kraton D6945 | 60 | 47 | 2.54 | 1.11 | 15.1 | 1351 | Clear |
| 5729-41-8 | Kraton D6945 | 50 | 51 | 3.20 | 1.20 | 16.1 | 1374 | Clear |
| 5729-41-9 | Kraton D6945 | 40 | 54 | 3.64 | 1.30 | 16.1 | 1293 | Clear |
| 5729-41-10 | Kraton D6945 | 20 | 60 | 4.96 | 1.47 | 16 | 1600 | Clear |
| EPDM Nordel IP4725 | | 0 | 66 | 5.52 | 1.65 | 14.4 | 1211 | Clear |
| Hybrar 7125 | | 100 | 52 | 3.56 | 1.33 | 13.2 | 1200 | Clear |
| 5729-41-11 | Hybrar 7125 | 80 | 54 | 4.10 | 1.43 | 16.3 | 1268 | Transluscent |
| 5729-41-12 | Hybrar 7125 | 60 | 57 | 4.30 | 1.45 | 15.7 | 1211 | Transluscent |
| 5729-41-13 | Hybrar 7125 | 50 | 58 | 4.50 | 1.52 | 16.4 | 1305 | Transluscent |
| 5729-41-14 | Hybrar 7125 | 40 | 60 | 4.70 | 1.60 | 15.5 | 1200 | Transluscent |
| 5729-41-15 | Hybrar 7125 | 20 | 62 | 5.20 | 1.62 | 15.9 | 1254 | Transluscent |
| EPDM Nordel IP4725 | | 0 | 66 | 5.52 | 1.65 | 14.4 | 1211 | Clear |
| Hybrar 7311 | | 100 | 38 | 1.58 | 0.80 | 9.3 | 1200 | Clear |
| 5729-41-16 | Hybrar 7311 | 80 | 42 | 2.15 | 0.95 | 9.6 | 1266 | Clear |
| 5729-41-17 | Hybrar 7311 | 60 | 48 | 2.76 | 1.08 | 12.5 | 1320 | Clear |
| 5729-41-18 | Hybrar 7311 | 50 | 53 | 3.70 | 1.23 | 16.3 | 1359 | Clear |
| 5729-41-19 | Hybrar 7311 | 40 | 55 | 4.12 | 1.29 | 15.3 | 1323 | Clear |
| 5729-41-20 | Hybrar 7311 | 20 | 60 | 5.06 | 1.45 | 15.8 | 1369 | Clear |
| EPDM Nordel IP4725 | | 0 | 66 | 5.52 | 1.65 | 14.4 | 1211 | Clear |

FIG. 1

| Sample Code | SBC Resin | SBC Resin, % | Shore Hardness, A | Young's Modulus, Mpa | 100%-Modulus, Mpa | Tensile Strength, Mpa | Elongation, % | Clarity |
|---|---|---|---|---|---|---|---|---|
| KRTON MD6945 | | 100 | NA | NA | NA | NA | NA | Clear |
| 5729-41-6 | Kraton D6945 | 80 | 41 | 1.8 | 0.52 | 8.99 | 996 | Clear |
| 5729-41-7 | Kraton D6945 | 60 | 48 | 3.1 | 0.68 | 16.1 | 1030 | Clear |
| 5729-41-8 | Kraton D6945 | 50 | 52 | 3.5 | 0.74 | 17.7 | 1002 | Clear |
| 5729-41-9 | Kraton D6945 | 40 | 56 | 4.0 | 0.78 | 16 | 999 | Clear |
| 5729-41-10 | Kraton D6945 | 20 | 61 | 4.7 | 0.90 | 17.5 | 971 | Clear |
| EPDM Nordel IP4725 | | 0 | NA | NA | NA | NA | NA | Clear |
| Hybrar 7311 | | 100 | NA | NA | NA | NA | NA | Clear |
| 5729-41-16 | Hybrar 7311 | 80 | 45 | 2.3 | 0.60 | 12.5 | 1057 | Clear |
| 5729-41-17 | Hybrar 7311 | 60 | 51 | 3.4 | 0.73 | 16.2 | 1011 | Clear |
| 5729-41-18 | Hybrar 7311 | 50 | 53 | 4.3 | 0.76 | 17.3 | 990 | Clear |
| 5729-41-19 | Hybrar 7311 | 40 | 56 | 4.5 | 0.87 | 18 | 991 | Clear |
| 5729-41-20 | Hybrar 7311 | 20 | 63 | 5.9 | 0.95 | 17.7 | 984 | Clear |
| EPDM Nordel IP4725 | | 0 | NA | NA | NA | NA | NA | Clear |

FIG. 2

| Tubing Formulation | | | Before E-beam Treatment | | | | | | |
|---|---|---|---|---|---|---|---|---|---|
| Tubing ID | Blend Formulation | Lubricant Material | Clarity | MBR, in (stdev) | Hardness, A | 100%-Modulus, MPa | Tensile Strength, MPa | Pump life at 400rpm, hr | Elongation, % |
| 5727-189-7 | Nordel IP 4725/Kraton SEBS 1643 =50/50 | None | Translucent | 0.67 | 62 | 1.6 | 12.4 | 2 | 1027 |
| 5727-189-8 | Nordel IP 4725/Kraton SEBS 1643 =50/50 | 1% silicone oil | Translucent | 0.66 | 60 | 1.5 | 14.5 | 11.5 | 1121 |
| 5729-6-6 | Nordel IP 4725/Kraton SEBS 1643 =50/50 | 1% Lubotene RLF4006 | Translucent | 0.58 | 59 | 1.5 | 14.2 | 8 | 1210 |
| 5729-6-7 | Nordel IP 4725/Kraton SEBS 1643 =50/50 | 1% Ampacet 102468 | Translucent | 0.61 | 60 | 1.7 | 14.8 | 6 | 1224 |

FIG. 4

| Tubing Formulation | | | After E-beam Treatment | | | | | | |
|---|---|---|---|---|---|---|---|---|---|
| Tubing ID | Blend Formulation | Lubricant Material | Clarity | MBR, in (stdev) | Hardness, A | 100%-Modulus, MPa | Tensile Strength, MPa | Pump life at 400rpm, hr | Elongation, % |
| 5727-189-7 | Nordel IP 4725/Kraton SEBS 1643 =50/50 | None | Translucent | 0.65 | 62 | 2.0 | 13.1 | 24 | 863 |
| 5727-189-8 | Nordel IP 4725/Kraton SEBS 1643 =50/50 | 1% silicone oil | Translucent | 0.64 | 60 | 1.7 | 17.8 | 39 | 970 |
| 5729-6-6 | Nordel IP 4725/Kraton SEBS 1643 =50/50 | 1% Lubotene RLF4006 | Translucent | 0.61 | 60 | 1.9 | 16.9 | 13 | 951 |
| 5729-6-7 | Nordel IP 4725/Kraton SEBS 1643 =50/50 | 1% Ampacet 102468 | Translucent | 0.62 | 61 | 1.8 | 17.2 | 38 | 947 |

FIG. 5

| Sample # | Surlyn 8320 | TPE Resin | Amount of Polyolefin Resin | Hardness of TPE Resin | Brabender Blending Results | Measured Hardness, Shore A | E, Mpa | E-100%, Mpa | , % | Strength, Mpa | Tear, ppi |
|---|---|---|---|---|---|---|---|---|---|---|---|
| 5729-157-1 | 100g | Lotryl 30BA02 | 100g | 75A | clear, hazy | 79 | 14.6 | 3.5 | 722 | 14 | 277 |
| 5729-157-2 | 100g | Lotryl 29MA03 | 100g | 75A | translucent | 74 | 11.8 | 3.3 | 743 | 14 | 260 |
| 5729-157-3 | 100g | Lotrader 3430 | 100g | 75A | clear, hazy | 83 | 21.7 | 4.5 | 754 | 19 | 308 |
| 5729-157-4 | 100g | Evatane 4055 | 100g | 60A | translucent | 68 | 9.0 | 2.6 | 712 | 11 | 252 |
| 5729-157-5 | 100g | Bivaloy AC1335 | 100g | 75A | translucent | 68 | 10.0 | 2.7 | 802 | 14 | 258 |
| 5729-157-6 | 100g | Elastollan 1180A50 | 100g | 80A | opaque | 79 | 17.1 | 4.3 | 465 | 10 | 329 |
| 5729-157-7 | 100g | Pellethane 2103-80AEN | 100g | 80A | opaque | 78 | 15.5 | 4.3 | 498 | 11 | 349 |
| 5729-157-8 | 100g | Irogran A60 E4902 | 100g | 55A | translucent | 54 | 11.4 | 2.0 | 397 | 4 | 194 |
| 5729-157-9 | 100g | Estane 58213 | 100g | 75A | not mixed | NA | NA | NA | NA | NA | NA |
| 5729-157-10 | 100g | Vistamaxx 6120 | 100g | 63A | translucent | 69 | 10.9 | 2.9 | 711 | 12 | 299 |
| 5729-157-11 | 100g | Affinity EG8200 | 100g | 70A | translucent | 73 | 10.8 | 3.0 | 608 | 9 | 249 |
| 5729-157-12 | 80g | Nordel IP4725/mineral oil | 80g/40g | >95A | translucent | 57 | 6.7 | 1.9 | 725 | 7 | 170 |
| 5729-157-13 | 100g | Pebax 2533 | 100g | 77A | translucent | 72 | 14.5 | 3.7 | 696 | 14 | 297 |
| 5729-157-14 | 100g | Hytrel 3078 | 100g | 75A | translucent | 78 | 16.0 | 4.2 | 576 | 14 | 342 |
| 5729-157-15 | 100g | Infuse OBC 9607.15 | 100g | 60A | translucent | 65 | 10.5 | 2.5 | 493 | 6 | 209 |
| 5729-157-16 | 100g | Kraton G1643 | 100g | 70A | clear, hazy | 68 | 9.8 | 2.9 | 707 | 11 | 363 |
| 5729-157-17 | 100g | Kraton MD6945 | 100g | 65A | clear, hazy | 62 | 8.4 | 2.4 | 859 | 17 | 351 |
| 5729-157-18 | 100g | Nordel IP4725 | 100g | 65A | clear, hazy | 72 | 11.7 | 3.0 | >824 | >18.6 | 320 |

FIG. 11

FLEXIBLE TUBING MATERIAL AND METHOD OF FORMING THE MATERIAL

FIELD OF THE DISCLOSURE

This disclosure, in general, relates to a flexible tubing material and methods of making the aforementioned material.

BACKGROUND

Currently, flexible medical tubing is used to transport any variety of liquids during medical procedures. A flexible polyvinyl chloride (PVC) is a typical material used for medical tubing due to their inherent flexibility and translucency. Unfortunately, polyvinyl chloride tubing has significant amounts of low-molecular weight chemicals that can be leached into the human body during medical treatments. Further, disposal of PVC-based wasted by incineration causes environmental issues due to the release of toxic gases.

Alternative materials to flexible PVC have been adopted to make flexible medical tubing. Polymers that may be desired typically include those that are flexible, transparent, and appropriate for certain applications. Unfortunately, these polymers may not have all the physical or mechanical properties desired for flexible medical tubing applications. Further, many of these polymers do not perform well under steam sterilization due to severe softening at temperatures higher than about 100° C. As a result, manufacturers are often left to choose the physical and mechanical properties they desire without an option as to whether it can be steam sterilized.

As such, an improved polymeric material that can be steam sterilized is desired.

SUMMARY

In a particular embodiment, a flexible tubing material includes a radiation crosslinked blend of: a) a first elastomeric polymer including a styrenic thermoplastic elastomer, an ethylene vinyl acetate elastomer, a polyolefin elastomer, or combination thereof; and b) a second elastomeric polymer including a polyolefin elastomer, a diene elastomer, or combination thereof, with the proviso that the first elastomeric polymer and the second elastomeric polymer are different.

In another exemplary embodiment, a method of making a material includes providing a first elastomeric polymer including a styrenic thermoplastic elastomer, an ethylene vinyl acetate elastomer, a polyolefin elastomer, or combinations thereof; providing a second elastomeric polymer including a polyolefin elastomer, a diene elastomer, or combination thereof, with the proviso that the first elastomeric polymer and the second elastomeric polymer are different; blending the first elastomeric polymer and the second elastomeric polymer; extruding or injection molding the blend; and crosslinking the blend with radiation.

BRIEF DESCRIPTION OF THE DRAWINGS

The present disclosure may be better understood, and its numerous features and advantages made apparent to those skilled in the art by referencing the accompanying drawings.

FIG. 1 includes physical properties of exemplary blends of styrenic thermoplastic elastomer and a diene elastomer before cross-linking.

FIG. 2 includes physical properties of exemplary blends of styrenic thermoplastic elastomer and a diene elastomer after cross-linking.

FIG. 4 includes physical properties of exemplary blends of styrenic thermoplastic elastomer and a diene elastomer tubing before e-beam cross-linking treatment.

FIG. 5 includes physical properties of exemplary blends of styrenic thermoplastic elastomer and a diene elastomer tubing after e-beam cross-linking treatment.

FIG. 11 includes physical properties of exemplary blends of thermoplastic elastomers and ionomer elastomers before cross-linking.

The use of the same reference symbols in different drawings indicates similar or identical items.

DETAILED DESCRIPTION

Figure 3:
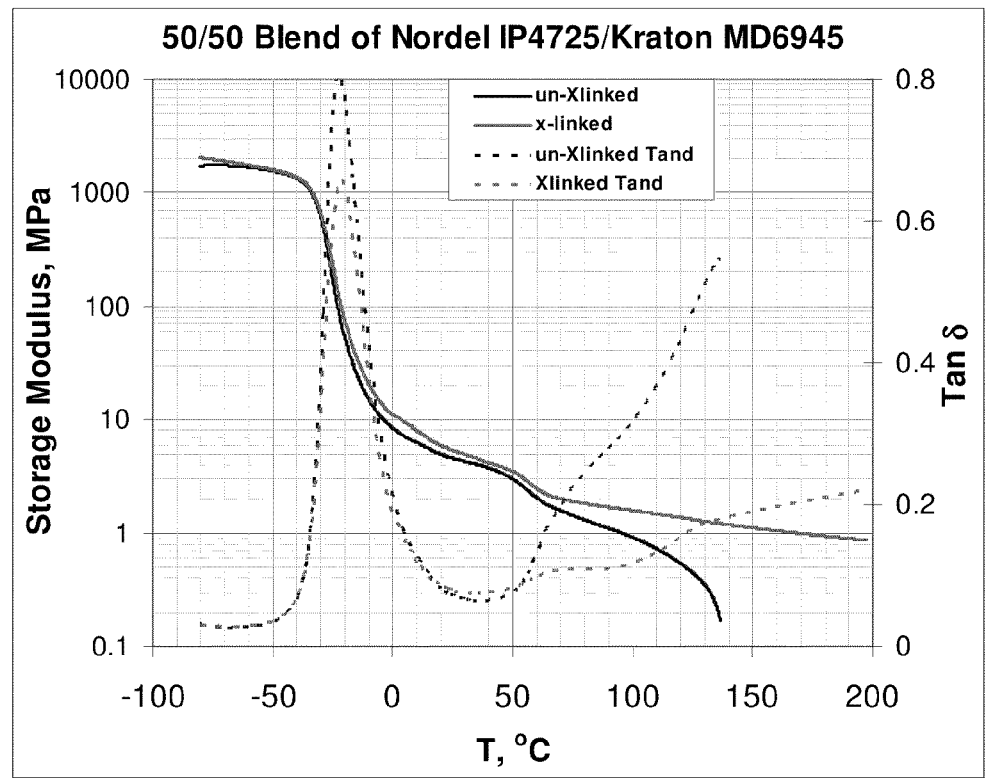
FIG. 3 includes a graphical illustration of Dynamic Mechanical Analysis (DMA) results for exemplary blends of styrenic thermoplastic elastomer and a diene elastomer with and without e-beam cross-linking treatment.

In a particular embodiment, a flexible tubing material includes a blend of a first elastomeric polymer with a second elastomeric polymer. Typically, the first elastomeric polymer is a styrenic thermoplastic elastomer, an ethylene vinyl acetate elastomer, a polyolefin elastomer, or combination thereof. Typically, the second elastomeric polymer is a polyolefin elastomer, a diene elastomer, or combination thereof. The flexible tubing material includes the first elastomeric polymer and the second elastomeric polymer with the proviso that the first elastomeric polymer and the second elastomeric polymer are different. In a particular embodiment, the first elastomeric polymer and the second elastomeric polymer are not both polyolefin elastomers. The blend of the first elastomeric polymer with the second elastomer advantageously provides a material that can be radiation crosslinked. In an example, radiation crosslinking includes gamma radiation and e-beam radiation. Further, the radiation crosslinked material can be sterilized.

Typically, the styrenic thermoplastic elastomer is a styrene based block copolymers such as styrene-butadiene, styrene-isoprene, blends thereof, mixtures thereof, and the like. In an embodiment, any styrenic thermoplastic elastomer is envisioned. Exemplary styrenic thermoplastic elastomers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combinations thereof. Commercial examples include some grades of Kraton™ and Hybrar™ resins. In an embodiment, the styrenic thermoplastic elastomer contains at least one free olefinic double bond, i.e. an unsaturated double bond. For instance, the presence of the free olefinic double bond in the polymer provides molecular sites that will crosslink under radiation. Exemplary styrenic polymers with unsaturated double bonds include styrene-isoprene-butadiene-styrene (SIBS), styrene-isoprene-styrene (SIS), styrene-butadiene-styrene (SBS), and the like. In an embodiment, the styrenic thermoplastic elastomer is saturated, i.e. does not contain any free olefinic double bonds.

Typically, the styrenic thermoplastic elastomer has a molecular number of at least about 15,000 Mn, such as at least about 25,000 Mn. In an embodiment, the styrenic thermoplastic elastomer is present at an amount of at least 10% by weight, such as at least about 20% by weight, or even at least about 30% by weight of the total weight of the blend. Typically, the level of the styrenic thermoplastic elastomer present in the blend may be optimized based on the final properties desired.

Typically, the ethylene vinyl acetate elastomer is an amorphous polar polymer. "Amorphous" as used herein refers to a polymer that is substantially non-crystalline, i.e. with no crystalline melting point. The amount of vinyl acetate found in the ethylene vinyl acetate polymer determines the crystallinity of the polymer. In particular, the higher the percentage of vinyl acetate in the EVA copolymer, the more the crystalline regularity of the ethylene chain is disturbed or destroyed. Crystallization is progressively hindered and is substantially absent with an EVA copolymer containing about 50% vinyl acetate, rendering an amorphous polymer. In an embodiment, the ethylene vinyl acetate of the present disclosure has a vinyl acetate content of greater than about 50% by weight of the total weight of the ethylene vinyl acetate. For instance, the ethylene vinyl acetate has a vinyl acetate content of greater than about 60% by weight to about 80% by weight of the total weight of the ethylene vinyl acetate, such as about 60% by weight to about 70% by weight of the total weight of the ethylene vinyl acetate. Further, the glass transition temperature, Tg, is typically low for the amorphous polymer, i.e. less than about 0° C. In an embodiment, the glass transition temperature for amorphous ethylene vinyl acetate is less than about 0° C., such as less than about −15° C., or even less than about −25° C. In an embodiment, the ethylene vinyl acetate has a number average molecular weight (Mn) of about 70,000 to about 90,000, such as about 80,000 to about 85,000. The ethylene vinyl acetate may have a weight average molecular weight (Mw) of about 250,000 to about 400,000, such as about 280,000 to about 350,000. In an embodiment, the ethylene vinyl acetate has a poly dispersity index (Mw/Mn) of about 3.0 to about 5.0, such as about 3.5 to about 4.0. In an embodiment, the ethylene vinyl acetate has a desirable melt flow index (MI), such as about 1 to about 7, such as about 1.5 to about 6, at a testing parameter of 190° C./21.1N. Generally, the melt viscosity at 200° C. with a 100 l/s shear rate may be up to about 600 Pa·s, such as about 400 Pa·s to about 500 Pa·s. With a 1000 l/s shear rate, the melt viscosity may be up to about 300 Pa·s, such as about 100 Pa·s to about 200 Pa·s. In an embodiment, the solution viscosity is up to about 2000 mPa·s, such as about 200 mPa·s to 1500 mPa·s at a 15% concentration in toluene, or up to about 50,000 mPa·s, such as about 7000 mPa·s to 30,000 mPa·s at a 30% concentration in toluene. A commercially available EVA is Elvax™ available from DuPont.

In an exemplary embodiment, the elastomeric ethylene vinyl acetate polymer has a desirable shore A hardness, such as about 30 to about 40. In contrast, a crystalline polar polymer, such as crystalline EVA typically has a shore A hardness of more than 40.

Typically, amorphous ethylene vinyl acetate is synthesized by solution polymerization at a pressure of about 200 bar to about 1000 bar and a temperature of about 50° C. to about 120° C. In an embodiment, the amorphous ethylene vinyl acetate may be synthesized by emulsion polymerization conducted at about 1 bar to about 200 bar pressure and temperature of 30-70° C. In contrast, crystalline ethylene vinyl acetate is prepared by mass polymerization at a pressure of about 1000 bar to about 3000 bar at a temperature of about 150° C. to about 350° C.

In an example, the blend includes the ethylene vinyl acetate present at a range of about 1% by weight to about 99% by weight of the total weight of the polymeric blend. In an embodiment, the ethylene vinyl acetate is present at greater than at least about 5% by weight of the total weight of the polymeric blend, such as greater than about least about 15% by weight of the total weight of the polymeric blend. In a particular embodiment, the ethylene vinyl acetate is present at greater than about least about 10% by weight of the total weight of the polymeric blend, such as a range of about 10% by weight to about 90% by weight of the total weight of the polymeric blend, or even a range of about 25% by weight to about 80% by weight of the total weight of the polymeric blend. Typically, the level of the ethylene vinyl acetate present in the blend may be optimized based on the final properties desired.

In a particular embodiment, the blend includes a polyolefin elastomer. Any polyolefin elastomer is envisioned. A typical polyolefin may include a homopolymer, a copolymer, a terpolymer, an alloy, or any combination thereof formed from a monomer, such as ethylene, propylene, butene, pentene, methyl pentene, hexene, octene, or any combination thereof. In an embodiment, the polyolefin elastomer may be copolymers of ethylene with propylene or alpha-olefins or copolymers of polypropylene with ethylene or alpha-olefins made by metallocene or non-metallocene polymerization processes. Commercial polyolefin examples include Affinity™, Engage™, Flexomer™, Versify™, Infuse™, Exact™, Vistamaxx™, Softel™ and Tafiner™, Notio™ produced by Dow, ExxonMobil, Londel-Basell and Mitsui. In an embodiment, the polyolefin elastomer may include copolymers of ethylene with polar vinyl monomers such as acetate (EVA), acrylic acid (EAA), methyl acrylate (EMA), methyl methacrylate (EMMA), ethyl acrylate (EEA) and butyl acrylate (EBA). Exemplary suppliers of these ethylene copolymer resins include DuPont, Dow Chemical, Mitusi and Arkema etc. In another embodiment, the polyolefin elastomer can be a terpolymer of ethylene, maleic anhydride and acrylates such as Lotader™ made by Arkema and Evalloy™ produced by DuPont. In yet another embodiment, the polyolefin elastomer can be an ionomer of ethylene and acrylic acid or methacrylic acid such as Surlyn™ made by DuPont. In an embodiment, the polyolefin is a reactor grade thermoplastic polyolefin elastomer, such as P6E2A-005B available from Flint Hills Resources. In an embodiment, the polyolefin elastomers should have flexural modulus lower than 200 MPa. Typically, the polyolefin elastomer is present at an amount of at least 10% by weight, such as at least about 20% by weight, or even at least about 30% by weight of the total weight of the blend. Typically, the level of the polyolefin elastomer present in the blend may be optimized based on the final properties desired.

In an embodiment, the blend may include a diene elastomer. Any appropriate diene elastomer is envisioned. For instance, the diene elastomer may be polybutadiene and polyisoprene or their copolymers; it can also be a terpolymer of ethylene, propylene and a diene monomer (EPDM). In an embodiment, the diene elastomer may be synthesized by any means envisioned. For instance, the diene elastomer is synthesized by metallocene or non-metallocene polymerization processes. In an exemplary embodiment, the EPDM is a reaction product of dienes such as DCPD (dicyclopentadiene), ENB (ethylidene norbornene) and VNB (vinyl norbornene). Exemplary EPDM resins are available from ExxonMobil Chemical as Vistalon™ and Dow Chemical as Nordel™ and other suppliers. In an embodiment, the diene elastomer is present at an amount of at least 10% by weight, such as at least about 20% by weight, or even at least about 30% by weight of the total weight of the blend. Typically, the level of the diene elastomer present in the blend may be optimized based on the final properties desired.

To crosslink the blends by irradiation of e-beam or gamma rays, reactive sites are needed in the blends. For instance, in the embodiment when the styrenic thermoplastic elastomer contains at least one free olefinic double bond, the free olefinic double bond in the polymer provides molecular sites that will crosslink under radiation. In an embodiment, if saturated resins are used to make the blends, small amount of radiation sensitizers or cros slinking promoters may be added to assure sufficient crosslinking and prevent degradation of the materials caused by chain scission during exposure to radiation. Any reasonable radiation sensitizer may be envisioned. Exemplary radiation sensitizers are typically multifunctional monomers such as: diethylene glycol dimetharylate (DEGDMA), trimethylolpropane trimetharcylate (TMPTMA), dipenta erithritol acrylate (DPEA), tetramethylol methane tetraacrylate (TMMTA), triallyl cyanurate (TAC), toluene diisocyanante (TDI), hexamethylene diisocyanate (HMDI), m-phenylene dimaleimide, the like, and any combination thereof. When used, the radiation sensitizer may be present at about 0.5% to about 3.0% by weight of the total weight of the blend.

In an embodiment, a crosslinking promoter may be used to provide reactive sites to crosslink the blends by irradiation. Any reasonable crosslinking promoter may be envisioned. Exemplary crosslinking promoters include polymers with unsaturated double bonds in the molecular chains such as polyisoprene, polybutadiene, EPDM, SIS, SBS, the like, and any combination thereof. In a particular embodiment, the unsaturated double bonds of the crosslinking promoters will crosslink by e-beam or gamma rays. Typically, the crosslinking promoter may be present at greater than about 5.0% by weight of the total weight of the blend.

In an embodiment, an oil may be used in the blend. Any suitable oil may be envisioned. In a particular embodiment, the oil is mineral oil that is either paraffinic or naphthenic or a mixture of paraffinic or naphthenic with zero aromatic content. For instance, a mineral oil may be used at an amount of about 0% by weight to about 70% by weight of the total weight of the blend. In an embodiment, the blends are substantially oil-free. "Substantially oil-free" as used herein refers to a blend that includes mineral oil present at less than about 0.1% by weight of the total weight of the blend. For instance, the styrenic thermoplastic elastomers may be melt-processible without the addition of an extending oil or plasticizer. In an embodiment, the ethylene vinyl acetate elastomers may be melt processible without the addition of an extending oil or plasticizer.

In an exemplary embodiment, the blend further includes any additive envisioned such as a lubricant, a filler, a plasticizer, an antioxidant, or any combination thereof. Exemplary lubricants include silicone oil, waxes, slip aids, antiblock agents, and the like. Exemplary lubricants further include silicone grafted polyolefin, polyethylene or polypropylene waxes, Oleic acid amide, erucamide, stearate, fatty acid esters, and the like. Typically, the lubricant may be present at less than about 2.0% by weight of the total weight of the blend. In an embodiment, the lubricant may be present at less than about 0.5% by weight of the total weight of the blend. Exemplary antioxidants include phenolic, hindered amine antioxidants. Exemplary fillers include calcium carbonate, talc, radio-opaque fillers such as barium sulfate, bismuth oxychloride, any combinations thereof, and the like. Exemplary plasticizers include any known plasticizers such as mineral oils and the like. Typically, an additive may be present at an amount of not greater than about 50% by weight of the total weight of the blend, such as not greater than about 40% by weight of the total weight of the blend, or even not greater than about 30% by weight of the total weight of the blend. Alternatively, the blend may be free of lubricants, fillers, plasticizers, and antioxidants.

The components of the blend of the first elastomeric polymer with the second elastomeric polymer may be melt processed by any known method to form the blend. In an embodiment, the first elastomeric polymer with the second elastomeric polymer may be melt processed by dry blending or compounding. The dry blend may be in powder, granular, or pellet form. The blend can be made by a continuous twin-screw compounding process or batch related Banbury process. Pellets of these blends may then be fed into a single screw extruder to make articles such as flexible tubing products. Blends can also be mixed in a single-screw extruder equipped with mixing elements and then extruded directly into articles such as tubing products. In a particular embodiment, the blend can be melt processed by any method envisioned known in the art such as laminating, casting, molding, and the like. In an embodiment, the blend can be injection molded.

In an embodiment, any article can be made out of the blends depending on specific application needs. The resulting articles are then irradiated using e-beam or gamma-rays in a batch process or a roll-to-roll process. In a particular embodiment, e-beam radiation includes an electron beam generated by a Van de Graaff generator, an electron-accelerator. E-beam with energy of between about 0.5 Mev to about 10.0 Mev from an electron beam accelerator can be used to crosslink the blend of the resulting article. Doses between about 10 KGy to about 200 KGy (about 1 Mrad to about 20 Mrad) are typical. In an exemplary embodiment, for cros slinking of the blend by gamma rays, about 1 Mrad to about 10 Mrad of radiation from a $^{60}$Co source can be used.

The polymeric blends advantageously can withstand sterilization processes. In an embodiment, the polymeric blend is sterilized by any method envisioned. For instance, the polymeric blend is sterilized after radiation crosslinking. Exemplary sterilization methods include steam, gamma, ethylene oxide, E-beam techniques, combinations thereof, and the like. In a particular embodiment, the polymeric blend is sterilized by steam sterilization. In an exemplary embodiment, the polymeric blend is heat-resistant to steam sterilization at temperatures up to about 121° C. for a time of up to about 30 minutes. In an embodiment, the polymeric blend is heat resistant to perform steam sterilization at temperatures of up to about 135° C. for a time of up to about 20 minutes.

In an embodiment, the polymeric blend may be formed into a single layer article, a multi-layer article, or can be laminated, coated, or formed on a substrate. Multi-layer articles may include layers such as reinforcing layers, adhesive layers, barrier layers, chemically resistant layers, metal layers, any combination thereof, and the like. The blend can be formed into any useful shape such as film, sheet, tubing, and the like. The polymeric blend may adhere or bond to other substrates including polyolefins (polypropylene (PP), polyethylene (PE), and the like) and styrenics (polystyrene (PS), acrylonitrile butadiene styrene (ABS), high impact polystyrene (HIPS), and the like.)

In a particular embodiment, the polymeric blend may be used to produce tubing and hoses. For instance, the polymeric blend can be used as tubing or hosing to produce low toxicity pump tubing, reinforced hosing, chemically resistant hosing, braided hosing, and low permeability hosing and tubing. For instance, tubing may be provided that has any useful diameter size for the particular application chosen. In an embodiment, the tubing may have an outside diameter (OD) of up to about 2.0 inches, such as about 0.25 inch, 0.50 inch, and 1.0 inch. Tubing of the polymeric blend advantageously exhibits desired properties such as chemical stability and increased lifetime. For example, the tube may have a pump life greater than about 10 hours, such as greater than about 20 hours, or even greater as measured at 600 RPM using a standard pump head.

The present embodiments can produce low toxicity articles having desirable mechanical properties. In a particular embodiment, the radiation crosslinked article formed is substantially free of plasticizers or other low-molecular weight extenders that can be leached into the fluids it transfers. "Substantially free" as used herein refers to a radiation crosslinked article having a total organics content (TOC) (measured in accordance to ISO 15705 and EPA 410.4) of less than about 100 ppm.

In embodiment, the resulting radiation crosslinked articles may have further desirable physical and mechanical properties. For instance, the radiation crosslinked articles are flexible, kink-resistant and appear transparent or at least translucent. In particular, the resulting radiation crosslinked articles have desirable flexibility, substantial clarity or translucency, desirable glass transition temperatures, desirable low temperature performance, and chemical resistance to oils and alcohols. For instance, the radiation crosslinked articles of the first elastomeric polymer with the second elastomeric polymer may advantageously produce low durometer articles. For example, a radiation crosslinked article having a Shore A durometer of between about 40 and about 90 having desirable mechanical properties may be formed. Such properties are indicative of a flexible material.

In addition to desirable hardness, the radiation crosslinked articles have advantageous physical properties, such as desirable ultimate elongation and low compression set at elevated temperatures. Ultimate elongation is determined using an Instron instrument in accordance with ASTM D-412 testing methods. For example, the radiation crosslinked articles may exhibit an ultimate elongation of at least about 400%, such as at least about 500%, such as at least about 600%, or even at least about 700%. In an embodiment, the compression set in accordance with ASTM D-395 measured at about 121° C. of the radiation crosslinked articles is less than about 50%.

Applications for the polymeric blend are numerous. In particular, the non-toxic nature of the polymeric blend makes the material useful for any application where toxicity is undesired. For instance, the polymeric blend has potential for FDA, USP, and other regulatory approvals. In an exemplary embodiment, the polymeric blend may be used in applications such as industrial, medical, health care, biopharmaceutical, drinking water, food & beverage, laboratory, and the like. In an embodiment, the polymeric blend may also be safely disposed as it generates substantially no toxic gases when incinerated and leaches no plasticizers into the environment if land filled.

EXAMPLES

Example 1

Blend of Styrenic Thermoplastic Elastomer and a Polyolefin

Kraton D2109 is tested for mechanical and physical properties. In general terms, Kraton D2109 is a melt compounded material of styrenic TPE resin, polyolefin, and mineral oil obtained from Sonneborn, Petrolia, Pa. Kraton D2109 is injection molded at a flat profile of about 400° F. into plaques for Shore A hardness, tensile and high temperature compression set testing. It is also directly extruded into 0.375" outside diameter (OD)×0.25" inner diameter (ID) tubing. Processability is good as there are no problems with tube dimensions and temperature window. It is silky to touch (as opposed to being "grabby" as is the case with C-Flex) and has a "silicone feel". The tube noticeably displayed signs of resilience and elasticity. The plaques and tubing coils are irradiated with e-beam at 2 different dosage rates of about 6.8 MRad and about 13.6 MRad corresponding to 4 and 8 passes each of about 1.7 MRad. The irradiated plaques are then tested for hardness, tensile and compression set as measured by ASTM D-395. The results are tabulated in Tables 1 and 2. Santoprene obtained from Advanced Elastomer Systems is used as comparison tubing with three grades tested for compression set.

TABLE 1

| Properties | | E-beam Exposed | |
| --- | --- | --- | --- |
| Kraton D2109 | Unexposed | 4 Passes | 8 Passes |
| Shore A Hardness | 49 | 50 | 52 |
| Break Strength, psi | 475 | 870 | 1045 |
| Ultimate Elongation, % | 970 | 690 | 735 |
| 120° C. Compression Set | 32.8 | 17.8 | 11.5 |

TABLE 2

| Santoprene Grade | 120° C. Compression Set |
| --- | --- |
| 8281-64 | 21.2 |
| 8281-65 | 27.9 |
| 8281-75 | 30.2 |

The ebeam crosslinked tube can be heat sealed, although at a higher temperature setting than normal with standard C-Flex. However, heat setting temperature has to be increased from 160° C. for standard C-Flex tube to about 180° C. to heat seal the radiation crosslinked Kraton D2109 tube. The irradiated Kraton D2109 product exhibits higher break strength, lower elongation at break and dramatically improved high temperature (120° C.) compression set that excels Santoprene's performance. The irradiated Kraton D2109 compound yields a hardness of about 50 A, about 1000 psi of break strength, about 735% ultimate elongation and compression set of about 12% at about 120° C.

Kraton D2109 pump tubing (0.25×0.38 inches) irradiated for up to 8 passes of ebeam for effecting crosslinking is subjected to peristaltic pump test at 600 RPM using a standard head. The irradiated tubing is also tested for pump life at 600 RPM using an EZ load head. For the sake of comparison, clear R70-374 C-Flex size 17 tubing is also tested on EZ load. As can be seen from results in Table 3 below, XL-CFlex (Kraton D2109) is pumped on the standard head for about 50 hours before failure. Surprisingly, the same tubing pumped for about 1000 hours on EZ load before failure. In comparison, clear C-Flex R70-374 is pumped for about 10 hours both on standard and EZ load heads before failure, indicating that the design of the pump head is inconsequential. Also, the spallation behavior of R70-374 is visually worse than irradiated Kraton D2109 (XL-CFlex) that shows minimal spallation (as visually observed during the pump test).

TABLE 3

| C-Flex | Pump Life (hours) | |
| --- | --- | --- |
| | Std. | EZ |
| XL-CFlex (Kraton D2109) (translucent) | ~50 | ~1000 |
| R70-374 (clear) | ~10 | ~10 |
| R70-001 (opaque C-P pump tubing) | ~50 | Not tested |
| AdvantaFlex (milky but translucent) | ~100 | Not tested |

Example 2

Blends of EPDM with Saturated Styrenic Block Copolymers (SBC)

To make flexible tubing, blends of diene elastomers and styrenic thermoplastic elastomer with hardness ranging from Shore A of about 40 to about 90 can be used. Diene elastomers and styrenic thermoplastic elastomers used to demonstrate the concept of making crosslinkable blends by ionizing radiation are listed in Table 4. Four styrenic thermoplastic elastomers of different chemistries and physical properties are chosen. Kraton G 1643M and Kraton MD 6945 are resins produced by Kraton Polymers and are based on chemistry of polystyrene-block-poly(ethylene-butylene)-block-polystyrene (SEBS). Hybrar 7125 has a chemical structure of polystyrene-block-poly(ethylene-co-propylene)-block-polystyrene (SEPS), while Hybrar 7311 has a chemical structure of polystyrene-block-poly[ethylene-co-(ethylene-co-propylene)]-block-polystyrene (SEEPS). The Hybrar resins are supplied by Kuraray Co. Ltd., Kurashiki, Japan. EPDM is chosen to make the crosslinkable blends. In an embodiment, EPDM resins made by the metallocene polymerization technology can be used in order to use common thermoplastic extrusion techniques to make tubing out of the blends. Unlike EPDM rubbers, which are completely amorphous and thus are in bale form at room temperature, the metallocene EPDM resins can be produced in pellet form due to some degree of crystallinity (typically in the range of about 5% to about 20% as measured by DSC at 10° C./min.) existing in this type of materials. Nordel IP 4725 provided by Dow Chemical is the metallocene EPDM resin selected to make crosslinkable blends in this Example. Nordel IP4725 resin is in transparent pellet form and is reported by the producer to have about 12% crystallinity.

TABLE 4

Styrenic thermoplastic elastomer and EPDM raw materials

| Materials | Grade | MFR, g/10 min @ 230° C. | Hardness, Shore A | 100%-Modulus, MPa | Tensile Strength, MPa |
| --- | --- | --- | --- | --- | --- |
| SBC Resin | Kraton 1643M | 18 | 52 | 1.5 | 6.3 |
| | Kraton MD6945 | 4 | 35 | 0.8 | 12.8 |
| | Hybrar 7125 | 4 | 64 | 1.7 | 13.2 |
| | Hybrar 7311 | 2 | 41 | 0.6 | 9.3 |
| EPDM | Nordel IP4725 | NA | 66 | 1.7 | 14.4 |

To make small batches of the blends, the polymer components are mixed in a Brabender mixer at different ratios at about 200° C. and about 60 rpm for about 5 min. The resulting mixtures are used to mold about 1 mm thick slabs in a Carver hot press. Dog-bone testing specimens are cut out of the slabs for tensile test. FIG. 1 lists the mechanical and optical properties of blends before crosslinking. It can be seen that transparent blends result for the EPDM/Kraton MD6945 and EPDM/Hybrar 7311 systems at all mixing levels, while translucent blends are obtained for blends of EPDM/Kraton G1643 and EPDM/Hybrar 7125. Hardness of these blends ranges from Shore A of about 40 to about 70, which is within the desired range for flexible thermoplastic elastomer tubes. The elongation of the resulting blends is usually higher than about 1000%. The modulus of the blends goes generally between the two extremes of raw resins and the tensile strength of the blends is higher than those for the raw resins.

To crosslink the blends, molded slabs are sent to E-BEAM Services Inc. in Lebaron, Ohio for crosslinking treatment. 10 samples from the EPDM/Kraton MD6945 and EPDM/Hybrar 7311 series are exposed to about 6.8 Mrad (4 passes×1.7 Mrad/pass) e-beam of about 10 MeV. After e-beam treatment, no samples show any changes in clarity or yellowing due to degradation. Gel content tests are conducted by soaking a crosslinked sample in boiling hexane for about 12 hrs and then measuring percentage of remaining solid content in the sample. About 40% to about 70% by weight gel content of the total weight of the blend is measured for the e-beam treated blends of EPDM/Kraton MD6945 and EPDM/Hybrar 7311 depending on their compositions. For untreated EPDM/styrenic thermoplastic elastomer samples, 0% gel content is found (completely dissolved). By comparing physical properties for crosslinked samples in FIG. 2 and results of corresponding un-crosslinked samples in FIG. 1, no significant changes are found in the e-beam treated blends in terms of hardness and modulus, slight increase in tensile modulus is found after e-beam treatment, while elongation of the crosslinked samples is seen to decrease by about 10% to about 20%.

To check the influence of e-beam exposure to heat resistance of the blends, dynamic mechanical analysis (DMA) is performed in the temperature range of about −80° C. to about 200° C. This test can determine the glass transition temperature, melting point of a thermoplastic by following changes in viscoelastic behavior of a material with temperature. In a typical DMA test, the storage modulus measures how stiff and elastic the material is, the loss modulus indicates how fluid-like and viscous the material is and the loss tangent is the ratio of loss modulus to storage modulus. For a polymer material to exhibit some heat-resistance so that no deformation occurs under its own weight when exposed to elevated temperatures, the storage modulus of the material is typically at least above about 1 MPa, while the loss tangent value is typically lower than about 0.25 MPa. Using these criteria, the maximum temperature that a thermoplastic elastomer material can be exposed to for short time, such as a steam sterilization process, can be estimated. FIG. 3 shows the change of storage modulus and loss tangent with temperature for the blend of 50/50 Nordel IP4725/EPDM. Without crosslinking by e-beam, storage modulus of the blend shows a sharp drop above about 100° C., suggesting a melting and flow behavior. Storage modulus falls below about 1 MPa at about 95° C. and loss tangent rises above about 0.25 at about 82° C., therefore the maximum short-term exposure temperature for this blend will be around 80° C. After crosslinking by about 6.8 Mrad e-beam, the storage modulus of the 50/50 Nordel IP4725/EPDM blend displays a plateau from about 70° C. and about 200° C. It does not fall below about 1 MPa until about 160° C. The loss tangent is not below about 0.25 MPa even at about 195° C. Therefore, this crosslinked blend is suitable for steam sterilization processes at both about 121° C. and about 135° C.

Example 3

Tubing Made of EPDM/Styrenic Thermoplastic Elastomer Blends

To make flexible tubing of the blends, mixtures of 50/50 Kraton G 1643M/Nordel IP45 with or without lubricating additives is compounded through a co-rotating twin-screw extruder and cooled by a water bath and cut into pellets. The resulting pellets are later fed into a single-screw extruder, which is equipped with a tubing die. A regular 3-zone screw is used for the tubing extrusion. The temperature profile is set at about 280° F., about 320° F. and about 400° F. for three segments of the extruder. The adapter and die temperatures are set at about 405° F. and about 415° F., respectively. The polymer melt flowing out of the die is discharged into a submerging water tank for cooling, where the extrudate is frozen into a tubing shape. Internal air pressure, screw speed and pulling rate are combined to control the tubing dimensions and wall thickness. Translucent and flexible tubing with dimensions of 0.25" for ID and 0.375" for OD is obtained through the above compounding and extrusion procedures. When an extruder with mixing screw sections is available, the twin screw compounding process can be omitted. Flexible tubing can be extruded from the blends by feeding dry blends of these resins directly into the extruder due to relatively high compatibility between EPDM and styrenic thermoplastic elastomers.

Tubing formulations and resulting tubing properties without e-beam crosslinking treatment are shown in FIG. 4. As low surface friction usually helps with pumping life in peristaltic pumping applications, three lubricants are evaluated at about 1% by weight addition level of the total weight of the blend. A 50% by weight silicone oil (vinyl terminated polydimethyl siloxane) master batch in EVA carrier resin is obtained from Dow Corning. Lubotene RLF4006 is a silicone grafted low density polyethylene (LDPE) resin obtained from Optatch Corporation. Ampacet 102468 is a master batch of Eruamide in LDPE supplied by Ampacet Corporation. At about 1.0% by weight addition level of the total weight of the blend, all three lubricants show no significant effects on the kink resistance, which is measured by MBR (minimum bending radius), clarity and mechanical properties of the tube. Lubricants do increase pumping life of the tubing when these tubes are used as the pumping segment in the standard head of a Masterflex peristaltic pump. The pumping tests are run at a speed of about 400 rpm in this study. Without lubricant, the tubing could only operate about 2 hours due to wearing caused failures. By adding about 1.0% by weight of lubricant, pumping life of the tubing is extended up to about 6-11 hrs.

Figure 6:
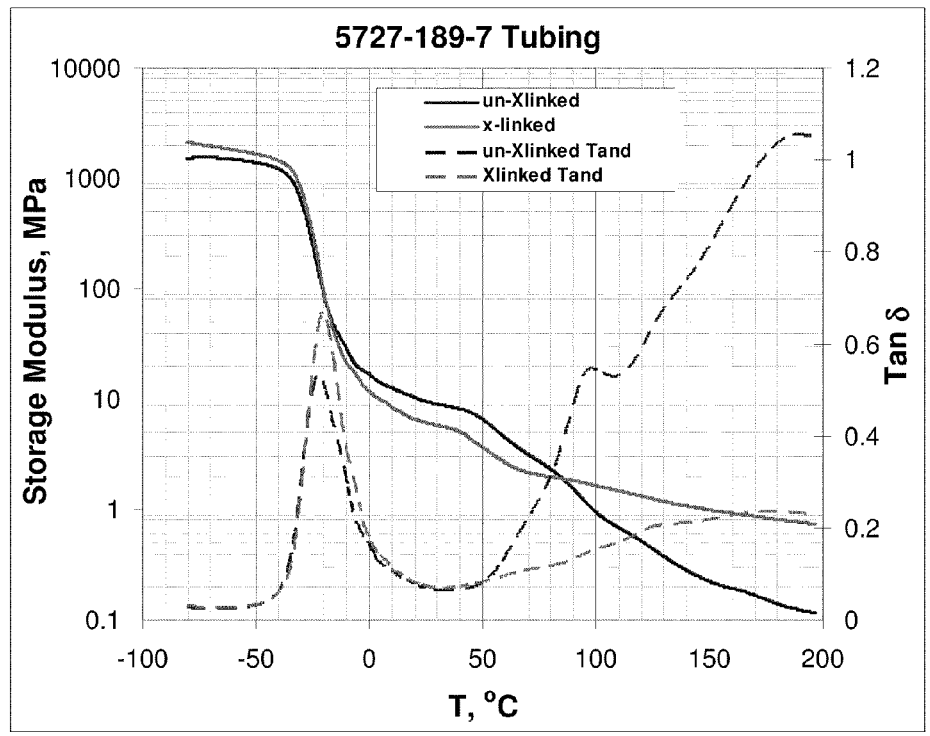
FIG. 6 includes a graphical illustration of Dynamic Mechanical Analysis (DMA) results for exemplary blends of styrenic thermoplastic elastomer and a diene elastomer with and without e-beam cross-linking treatment.

The tubes extruded from blends of 50/50 Kraton G 1643M/Nordel IP45 are also crosslinked by about 6.8 Mrads e-beam treatment. FIG. 5 lists properties of the tubes after e-beam crosslinking. Compared to the corresponding results in FIG. 4, it is clear that the e-beam crosslinking process do not affect clarity, kink resistance, hardness and tensile mechanical properties. However, a very significant improvement can be seen in pumping life of the tubing. The unlubricated tubing raises pump life from about 2 hrs to about 24 hrs, while the lubricated tubes improve their pump lives from about 6-11 hrs to the range of about 13-39 hrs. Furthermore, significant improvement in heat resistance of the tubes can be achieved through the e-beam crosslinking treatment. As illustrated by the DMA results in FIG. 6, the unlubricated tubing of 50/50 Kraton G 1643M/Nordel IP45 can only withstand short exposure to about 80° C., while the e-beam crosslinked tube can be used at about 130° C. for short term. Therefore, this crosslinked blend is suitable for steam sterilization processes at both about 121° C. for a time of up to about 30 minutes and about 135° C. for a time of up to about 20 minutes.

Example 4

Blends of Polyolefin Elastomers and Diene Elastomers

The following blends of polymers are mixed in different ratios at about 200° C. to 230° C. using a Brabender mixer. The resulting mixtures are molded into 2 mm thick slabs and dog bone testing specimens are cut out of the slabs for tensile and tear testing in accordance with ASTM 638 and ASTM 624, respectively. Properties can be seen in Table 5.

TABLE 5

| Sample | Storage modulus (MPa) at −70° C. | Storage modulus (MPa) at 100° C. | Tg at Tan Delta curve (° C.) |
|---|---|---|---|
| EPDM/EMA | 1987 | 0.489 | −19.67 |
| EPDM/EMA 4 e-beam passes | 1808 | 1.317 | −17.50 |
| EPDM/EMA 8 e-beam passes | 1796 | 1.633 | −16.69 |
| EPDM/EMA | 1735 | 1.505 | −16.12 |

Figure 7:
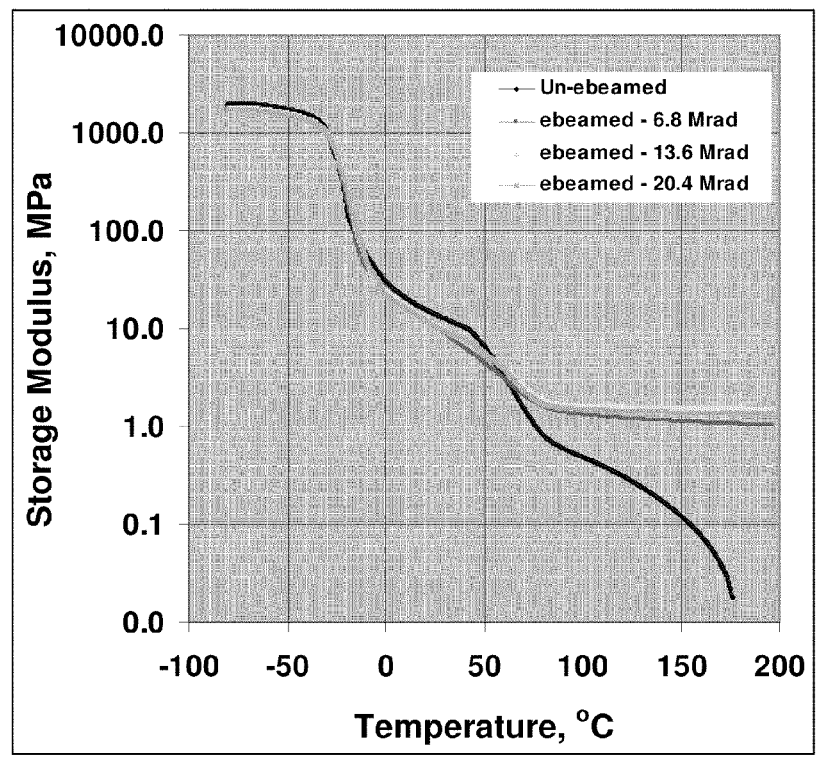
FIG. 7 includes a graphical illustration of Dynamic Mechanical Analysis (DMA) results for an exemplary blend of a terpolymer of ethylene, propylene and a diene monomer (EPDM) and ethylene methyl acrylate (EMA) with and without e-beam cross-linking treatment.

Dynamic mechanical analysis of the EPDM/EMA blend with and without e-beam irradiation can be seen in FIG. 7. 6.8 MRad (4 passes) of e-beam irradiation sufficiently crosslinks the EPDM/EMA blend. For instance, the EPMA/EMA blend that has not been e-beam irradiated is clearly not crosslinked as evidenced by the dramatic drop in storage modulus as the temperature increases. Further, 6.8 Mrad (4 passes) of e-beam irradiation is sufficient to create a blend with heat resistance at temperatures greater than 100° C. and in particular, steam sterilization processes at both about 121° C. for a time of up to about 30 minutes and about 135° C. for a time of up to about 20 minutes.

Four samples are chosen to be extruded into tubing 0.5625 inches OD×0.375 inches ID for evaluation. The formulation and properties before and after e-beam treatment can be seen in Tables 6, 7, and 8.

TABLE 6

| Materials | Grade | Amount | Hardness (Shore A) |
|---|---|---|---|
| Polyolefin resin | Elvax 360 | 100 g | 75 |
| | Versify 2400 | 100 g | 68 |
| | Affinity EG8200 | 100 g | 70 |
| | Engage 8180 | 100 g | 63 |
| EPDM | Nordel IP4725 | 100 g | 60 |

TABLE 7

Properties before e-beam treatment

| Material | Shore A hardness | Young modulus (MPa) | 100% Modulus (MPa) | 300% Modulus (MPa) | Tensile Strength (MPa) | Elongation (%) |
|---|---|---|---|---|---|---|
| EPDM/Elvax | 77 | 11.3 | 2.7 | 1.5 | 19.3 | 1048 |
| EPDM/Versify | 62 | 7.0 | 1.7 | 0.8 | 13.9 | 1255 |
| EPDM/Affinity | 66 | 6.5 | 2.0 | 1.0 | 13.4 | 1232 |
| EPDM/Engage | 64 | 5.3 | 1.8 | 1.0 | 15.9 | 1244 |

TABLE 8

Properties after e-beam treatment

| Material | Shore A hardness | Young modulus (MPa) | 100% Modulus (MPa) | 300% Modulus (MPa) | Tensile Strength (MPa) | Elongation (%) |
|---|---|---|---|---|---|---|
| EPDM/Elvax | 76 | 12.1 | 3.0 | 1.7 | 19.0 | 801 |
| EPDM/Versify | 60 | 6.9 | 1.7 | 0.9 | 11.1 | 982 |
| EPDM/Affinity | 67 | 6.8 | 2.0 | 1.1 | 17.5 | 1081 |
| EPDM/Engage | 64 | 5.3 | 1.8 | 1.0 | 15.6 | 991 |

As seen in Tables 5-8, the crosslinking of the blends provides materials with advantageous properties. After e-beam irradiation, the material remains flexible. The materials exhibit a negligible change in Young modulus, 100% Modulus, 300% Modulus, and tensile strength after e-beam treatment. After e-beam treatment, the material shows a slight decrease in Elongation which indicates no chain scission of the material.

Figure 8:
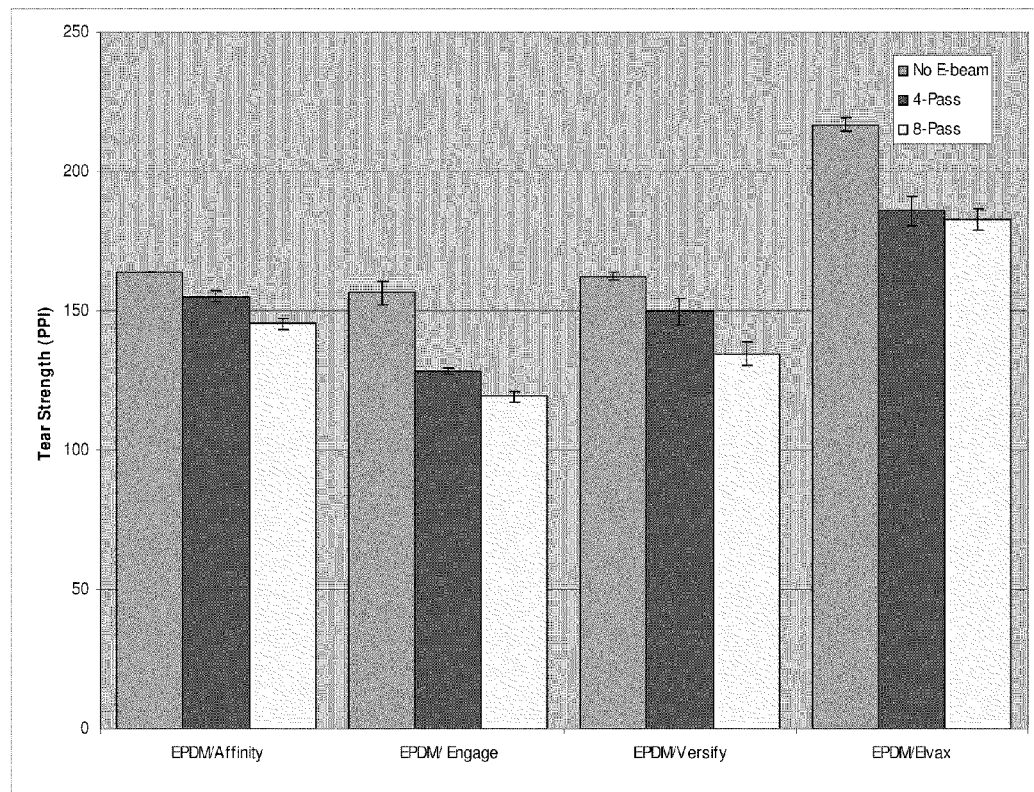
FIG. 8 includes a graphical illustration of tear testing results for exemplary blends of polyolefin elastomer and diene elastomer with and without e-beam cross-linking treatment.
Figure 9:
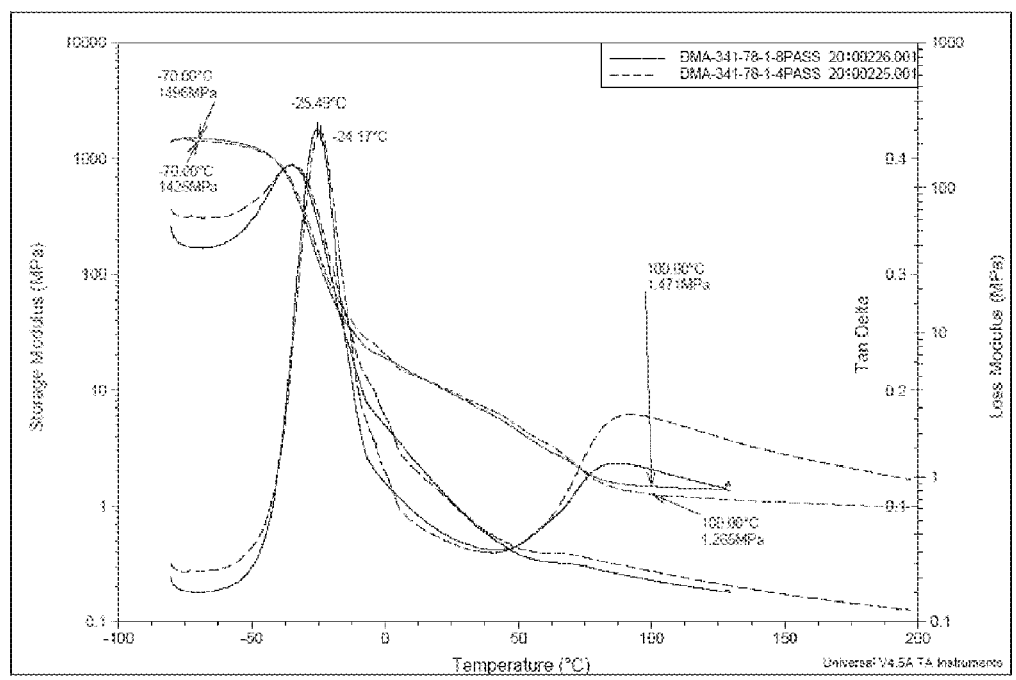
FIG. 9 includes a graphical illustration of Dynamic Mechanical Analysis (DMA) results for an exemplary blend of a polyolefin elastomer and a diene elastomer with and without e-beam cross-linking treatment.

Tear testing can be seen in FIG. 8. FIG. 9 is an illustration of the dynamic mechanical analysis (DMA) of a blend of EPDM/Affinity. The graphs show that there are no negligible change in properties from 4 to 8 e-beam passes. As seen in FIG. 9, 6.8 Mrad (4 passes) of e-beam irradiation is sufficient to create a blend with heat resistance at temperatures greater than 100° C. and in particular, steam sterilization processes at both about 121° C. for a time of up to about 30 minutes and about 135° C. for a time of up to about 20 minutes.

Figure 10:
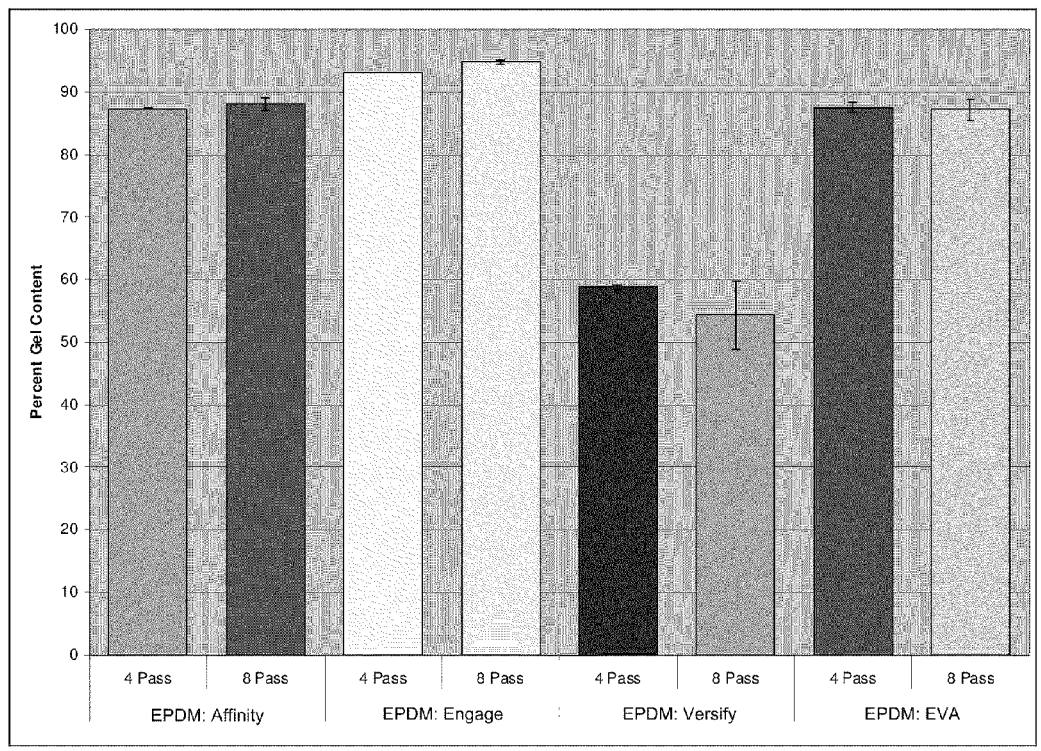
FIG. 10 includes a graphical illustration of gel content testing results for exemplary blends of polyolefin elastomer and diene elastomer with e-beam cross-linking treatment.

Gel content testing as described above is performed on the materials of Tables 5. As seen in FIG. 10, the gel content testing illustrates that there are no significant changes in the cross-link density between 4 and 8 e-beam passes.

Example 5

Blends of Thermoplastic Elastomers and Ionomers

Blends of polymers are mixed in different ratios at temperatures ranging from about 300° F. to about 400° F. using a Brabender mixer. The blends are compression molded at a flat profile of about 375° F. into plaques for Shore A hardness, Young modulus (E), 100% Modulus elongation (E-100%), elongation (c), tensile strength and tear strength testing. Shore A hardness ranges from about 50 to about 85, indicative of a soft, flexible material. Results can be seen in FIG. 11.

Two samples are chosen to be extruded into tubing 0.385 inches OD×0.255 inches ID for pump life evaluation, before and after e-beam treatment. Processability is good as there are no problems with tube dimensions and temperature window. Pump life is tested at 600 RPM using an EZ load II pump head. Results can be seen in Table 9.

TABLE 9

Pump life of styrenic thermoplastic elastomer/ionomer blend

| Material | Average Pump life (hours) |
|---|---|
| Surlyn 8320/SEBS G1643 (50:50 blend) | 1.90 |
| Surlyn 8320/SEBS G1643 (50:50 blend) 4 pass E-beam | 4.83 |
| Surlyn 8320/SEBS G1645 (50:50 blend) | 4.20 |
| Surlyn 8320/SEBS G1645 (50:50 blend) 4 pass E-beam | 14.83 |

As seen in Table 9, irradiation of the tubes increases the pump life of both blends.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A flexible biopharmaceutical thermoplastic elastomer tubing material comprising a gamma and/or e-beam radiation crosslinked blend of:
   a) a first elastomeric polymer including a styrenic thermoplastic elastomer comprising a styrene-butadiene-styrene (SBS), a styrene-isoprene- styrene (SIS), a styrene-ethylene butylene-styrene (SEBS), a styrene-ethylene propylene- styrene (SEPS), a styrene-ethylene-ethylene-butadiene-styrene (SEEBS), a styrene-ethylene-ethylene-propylene-styrene (SEEPS), a styrene-isoprene-butadiene-styrene (SIBS), or any combination thereof;
   b) a second elastomeric polymer including a polyolefin elastomer, with the proviso that the first elastomeric polymer and the second elastomeric polymer are different; and
   c) a plasticizer comprising a mineral oil,
   wherein the first elastomeric polymer is present in an amount of at least 10% by weight of the blend and the tubing material has a compression set of 18% or less at a temperature of about 121 ° C.

2. The flexible tubing material of claim 1, wherein the styrenic thermoplastic elastomer includes at least one free olefinic double bond.

3. The flexible tubing material of claim 1, wherein the polyolefin elastomer includes polypropylene, polyethylene, copolymers of ethylene with propylene, copolymers of ethylene with alpha-olefins, copolymers of ethylene with polar vinyl monomers, terpolymers of ethylene, maleic anhydride, and acrylates, ionomers of ethylene and acrylic acid, ionomers of ethylene and methacrylic acid, or combinations thereof.

4. The flexible tubing material of claim 1, further comprising a lubricant present at less than about 1.0% by weight of the total weight of the blend.

5. The flexible tubing material of claim 1, wherein the mineral oil is present at no greater than about 70.0% by weight of the total weight of the blend.

6. The flexible tubing material of claim 1, further comprising a radiation sensitizer, a crosslinking promoter, or combinations thereof.

7. The flexible tubing material of claim 1, wherein the radiation crosslinked blend has a shore A durometer of about 40 to about 90.

8. The flexible tubing material of claim 1, wherein the radiation crosslinked blend is heat resistant to steam sterilization temperatures of at least about 121 ° C.

9. The flexible tubing material of claim 1, wherein the radiation crosslinked blend is formed into a single layer tube or a multi-layer tube.

10. The flexible tubing material of claim 1, wherein the radiation crosslinked blend has a pump life of greater than about 50 hours as measured at 600RPM using a standard head.

11. The flexible tubing material of claim 1, wherein the first elastomeric polymer is present in an amount of at least 20 % by weight of the blend.

12. The flexible tubing material of claim 1, wherein the first elastomeric polymer is present in an amount of at least 30 % by weight of the blend.

* * * * *

UNITED STATES PATENT AND TRADEMARK OFFICE
CERTIFICATE OF CORRECTION

| | |
|---|---|
| PATENT NO. | : 8,956,706 B2 |
| APPLICATION NO. | : 12/981348 |
| DATED | : February 17, 2015 |
| INVENTOR(S) | : Sridhar Krishnamurthi Siddhamalli et al. |

It is certified that error appears in the above-identified patent and that said Letters Patent is hereby corrected as shown below:

In the specification
Column 8, Table 1: please move "Unexposed" from Line 32 to Line 31.

Signed and Sealed this
Twelfth Day of April, 2016

Michelle K. Lee
*Director of the United States Patent and Trademark Office*